April 30, 1957 W. MAYER 2,790,399
MACHINERY FOR MOLDING AND CUTTING OUT PIECES
OF PLASTIC MATERIAL FROM A WEB
Filed Jan. 5, 1953 7 Sheets-Sheet 1

Inventor
Willi Mayer
By S. T. Freeman
Attorney

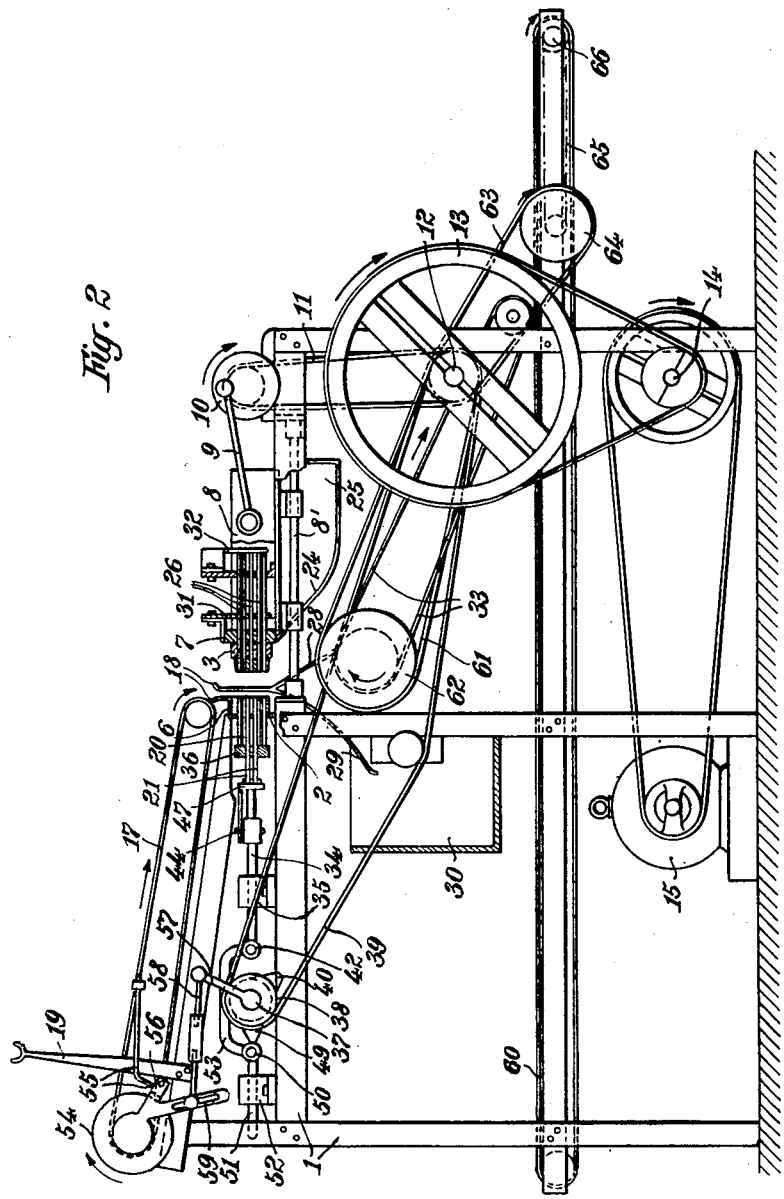

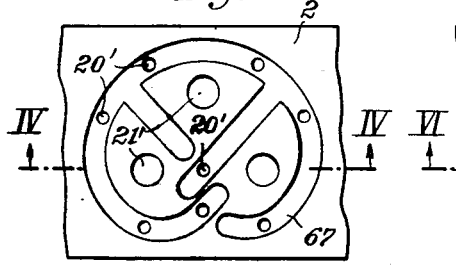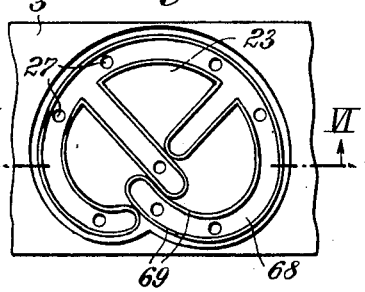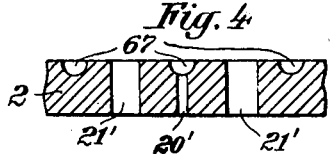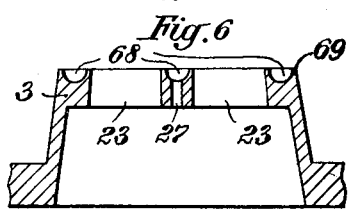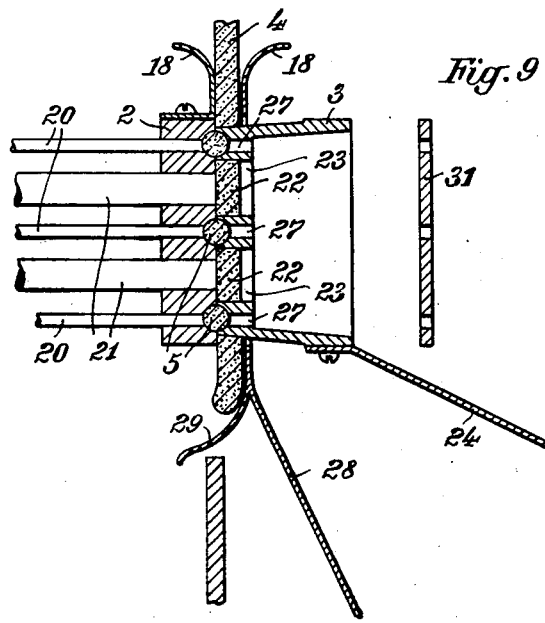

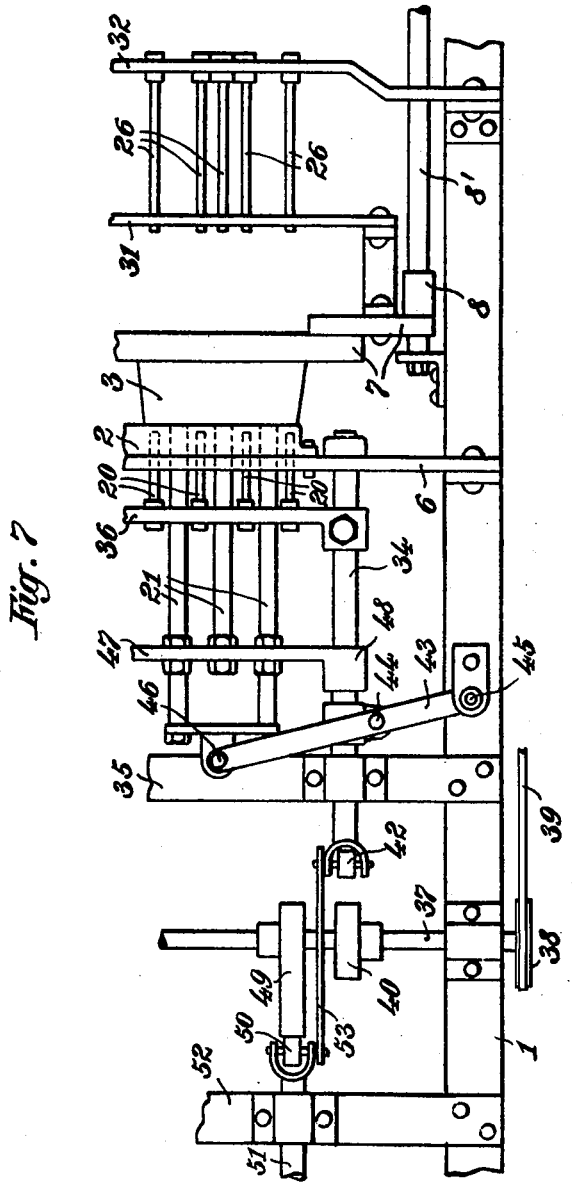

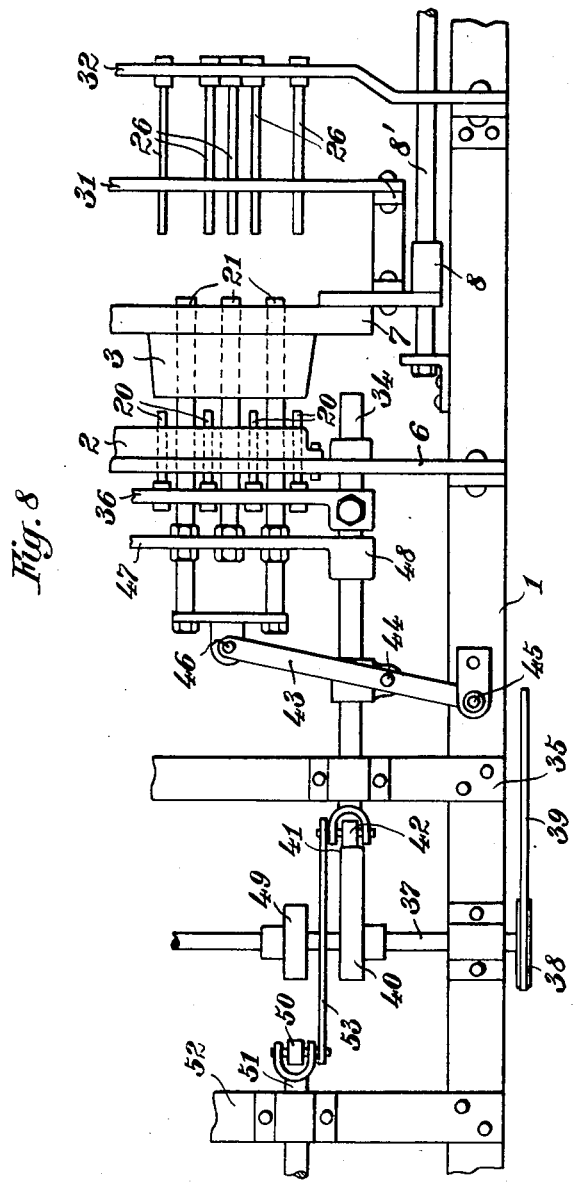

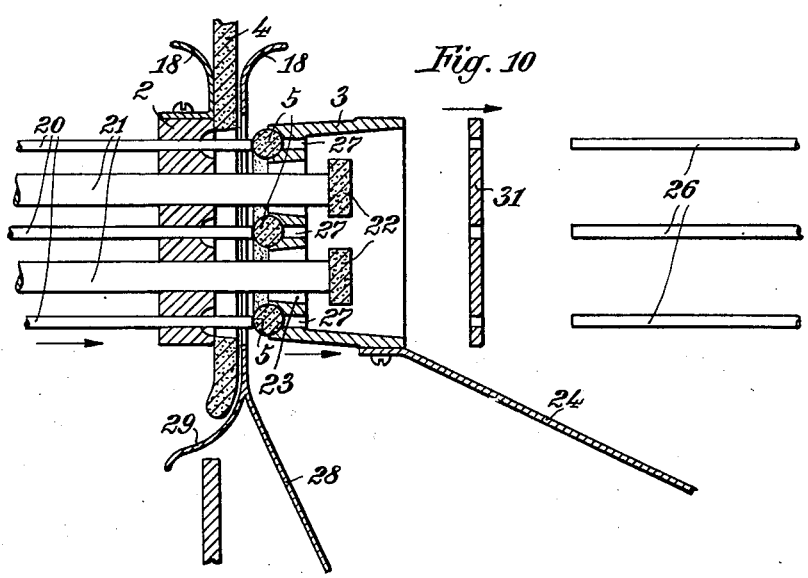
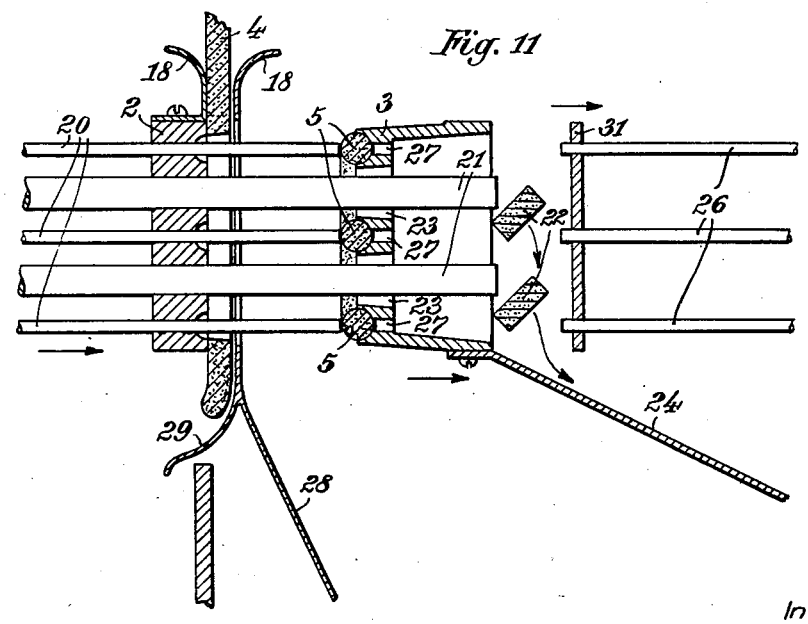

April 30, 1957
W. MAYER
2,790,399
MACHINERY FOR MOLDING AND CUTTING OUT PIECES OF PLASTIC MATERIAL FROM A WEB
Filed Jan. 5, 1953
7 Sheets-Sheet 7
Fig. 12
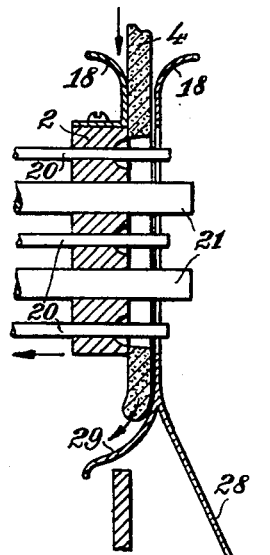
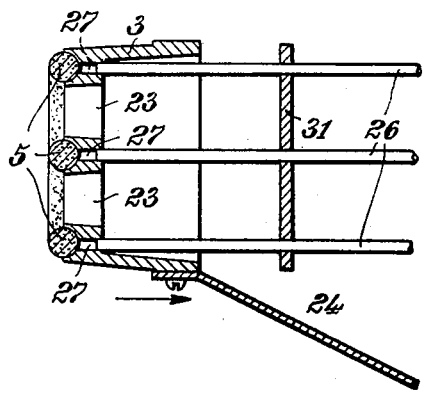
Fig. 13
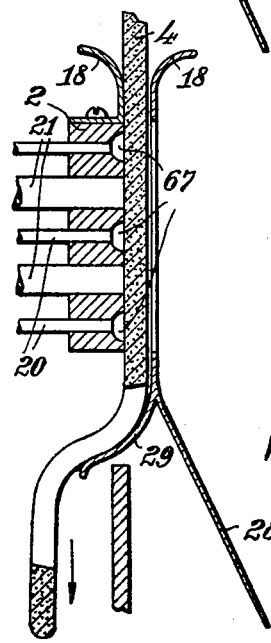
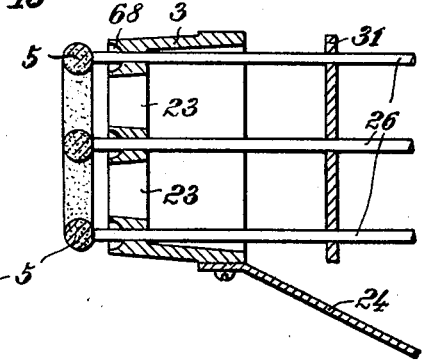
Inventor
Willy Mayer
By E. J. Freeman
Attorney United States Patent Office 2,790,399
Patented Apr. 30, 1957

2,790,399

MACHINERY FOR MOLDING AND CUTTING OUT PIECES OF PLASTIC MATERIAL FROM A WEB

Willi Mayer, Kandern, Baden, Germany

Application January 5, 1953, Serial No. 329,600

12 Claims. (Cl. 107—26)

The invention relates to a machine for cutting out shaped articles from a traveling web of a plastic material.

It is an object of the invention to provide means by which the cut articles are definitely separated from the traveling web and prevented from sticking to the same.

Another object of the invention is to provide means for delivering the cut articles to the next phase of the manufacturing process.

A still further object of the invention is to provide a machine of the type referred to which is of a compact construction needing a relatively small area.

Still another object of the invention is to provide a machine of the type referred to, adapted to produce articles with at least one extended hole or several openings, such as, rings or pretzels, and to remove in a reliable way the small scrap discs of dough which have been cut out together with the cutting operation for separating the article from the web.

Still another object of the invention is to produce pieces which are embossed on their upper and/or lower surface or which are of an entirely round cross section, like the sticks formed into a pretzel.

In order that the art may understand and properly utilize this invention I will describe its construction in detail, referring by numerals to the accompanying drawings forming part of this application, in which:

Fig. 2 is a side view of this machine, partly in section,

Figure 1:
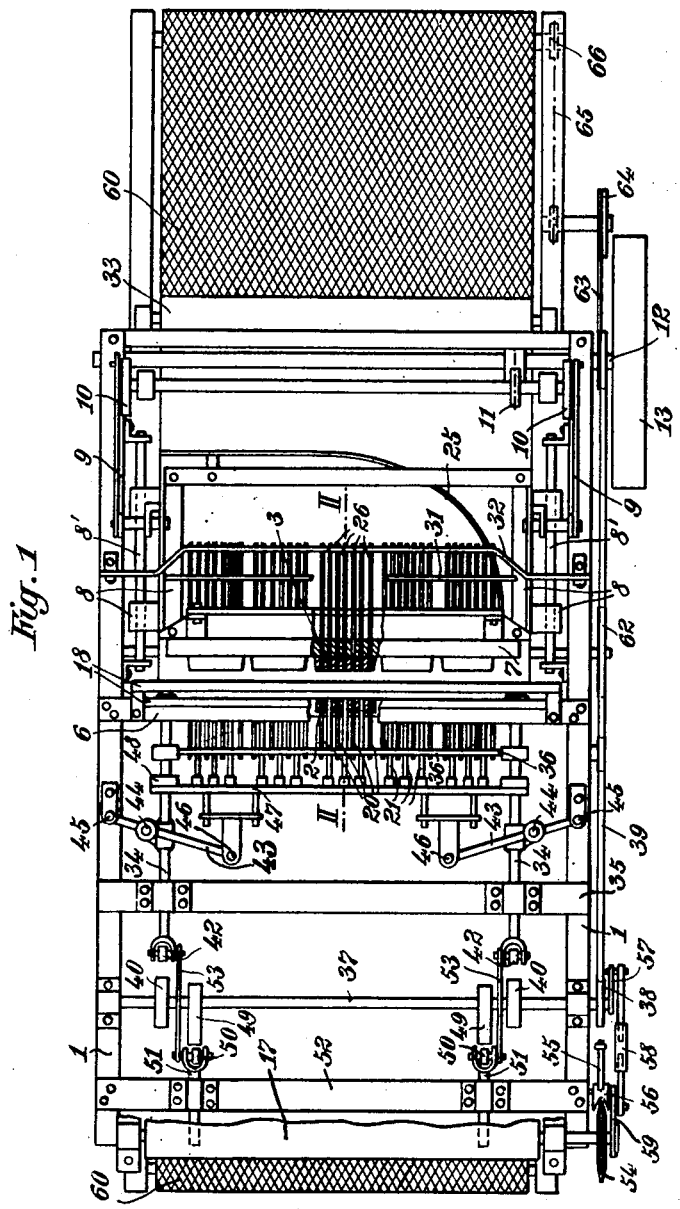
Fig. 1 is a plan view of a machine for producing the so called small "Kanderner or Freiburger pretzels,"

Fig. 3 is an elevation, showing the engraved side of the abutment plate forming the base for the cutting operation, Fig. 4 is a section through this base plate, taken on the line IV—IV in Fig. 3, Fig. 5 shows the engraved side of the cutter for pretzels, Fig. 6 is a section through the cutter, taken on line VI—VI of Fig. 5, Fig. 7 is a partial plan view of the same machine, showing the assembly of all parts, accomplishing all operations necessary for producing the pretzel, in their positions after having finished the cutting, embossing and forming processes, Fig. 8 is a plan view similar to Fig. 7, but showing another position of the parts, the cutter having already retracted from its cutting base plate and the small scrap discs of dough having been ejected from their position within the pretzel, Fig. 9 shows the forming process between cutter and base plate being finished, Fig. 10 shows the cutter together with the pressing or clamping fingers as they are being retracted from the web of dough, the ejector rods having already expelled the hole-scrap sections out of the formed pretzel, Fig. 11 shows the parts continuing their movement in the same direction as shown in Fig. 10, but in an advanced position, Fig. 12 shows the position of the parts, short of the outer end point of stroke of the cutter, and Fig. 13 shows the parts with the cutter having finished its stroke and the docker pins ejecting the formed pretzel.

Referring now to the drawings in greater detail, it will be seen that a guide consisting of two plates 18 bent outwardly at their top ends, for receiving the web of dough 4 coming from the rolling machine, is fixedly arranged in a frame 1 constructed, for instance, of angle iron, see Figs. 2 and 9. A conveying belt 17 may be used to feed the web of dough into the gap between the plates 18, said belt being intermittently driven from the main shaft 12 through a belt, rope or chain 39, a pulley 38, a crank arm 57, a connecting rod 58 with means for altering its length, a lever 59 and a disc 54. The disc 54 may either be a ratchet disc or a frictional disc. The lever 59 carries a pawl or frictional body 56, depending on whether the disc 54 is in form of a ratchet disc or frictional disc. The pawl or body 56 is connected to a weighted lever 55. The size of the feed step can be regulated by adjusting the position of the connecting pins of the rods 58 in relation to lever 59.

Where the web of dough instead of being continuously taken from a conventional web rolling device arranged above the machine, is prepared in definite lengths at a separate rolling machine, two supporting or bearing arms 19, Fig. 2, are fixedly arranged on the machine frame 1 whose upper bifurcated ends serve as a support for a round bar about which the plastic web of dough is wound.

The abutment for the cutter is formed by a base body or plate 2 which, depending on the product to be made, may be of smooth shape or in the form of a half-mold 67 for the manufacture of pretzels.

The cutter 3 which is horizontally slidable in the machine frame 1 by means of a slide or carriage 8, is also shaped in the form of a half-mould 68, Figs. 5 and 6, between its two cutting edges 69, whereby the half mould 67 of the base body 2 is completed to form a round cross sectional shape, as indicated in Fig. 9.

It will be understood that the cutter may have a flat bottom receding in relation to its cutting edge 69, where only flat shaped articles without any cross sectional shaping or embossing are to be made, for instance, flat cookies.

In order to ensure that the shaped article, for instance, the pretzel 5, is actually carried along with the cutter 3 as it is retracted, pressing fingers 20 (Fig. 9) or similar means are mounted in holes 20' (Figs. 3, 4) of the base body 2 so as to be slidable parallel of the cutting direction, said fingers 20 being controlled in such a manner, as hereinafter described in greater detail, that they at first take part in the retracting motion of the cutter 3, clamping the formed article 5 between the pressing fingers and the bottom of the cutter until the moulded article has been completely released from the web of dough. Thereupon the pressing fingers 20 return to this initial position indicated in Fig. 9.

In the general form of the machine according to the invention a flat formed article which is free from holes is ejected from the cutter 3 by the conventional ejectors which are mounted in the cutter and actuated for ejecting, but limited in their ejecting motion by fixed stops, or by cutters of the type shown in Figs. 12 and 13, preferably consisting of several ejecting pins 26 which are fixedly mounted on the machine frame and over which the cutters 3 are retracted at the end of their return motions.

In the manufacture of perforated articles, e. g., pretzels 5, it is necessary to use in combination with a known cutter an additional ejector for the small interior discs of dough 22 to be punched out from the cut article, see Figs. 9, 10, and 11. According to the invention the ejection of the discs 22 can best be effected without disturbance and without the danger of deformation of the shaped article 5 or its premature detachment from the cutter 3 by mounting the ejector for the pieces 22 in the same manner as the pressing fingers 20 in the base body 2, so as to be slidable in bores 21'. The control of this ejector which also comprises a plurality of pins 21 is arranged in such a way that the pressing fingers 20 and the ejector pins 21 are moving jointly and in the same direction, but with the pins 21 accelerated in relation to the press fingers 20. Thus the pieces 22 stamped out from the previously cut article are ejected through holes 23 of the cutter 3, Fig. 11, at a moment when the pretzel 5 is still fixedly clamped between the pressing fingers 20 and the half mold 68 of the cutter 3.

Thereafter the pressing fingers 20 and the pins 21 are retracted, see Fig. 12, while the formed article remains within the half mold 68 of the cutter 3, Fig. 12, until the cutter 3 is moving over the stationary ejector pins 26 which may be additionally guided through a plate 31 of cutter 3, whereat the ends of the cutter pins 26 traverse the holes 27 of the cutter 3, detaching the shaped pretzel 5 from the cutter 3 and throwing it off onto a chute 28 which may be connected with one of the two guiding plates 18 for the web of dough. The other guiding sheet is downwardly extended in the form of a deviating sheet 29 for the scrap web of the original web of dough 4, which scrap web now consists only of a network of dough.

The ejected pieces 22 drop onto an inclined chute 24 that is secured to the cutter 3 (Figs. 2, 9), or may be secured to the slide 8. The chute 24 will deliver the pieces 22 to a collecting box 25 (Fig. 2) which is connected to the chute 24 and is reciprocable therewith along with the cutter 3 and slide 8. Continuous and reliable removal of the hole scrap is ensured by the participation of the parts 24 and 25 in the reciprocating motion of the cutter 3.

The reliable slipping of the formed articles 5, e. g., of the pretzels, from the chute 28 is ensured by a corresponding steep inclination of the latter; on the other hand, care must be taken to avoid compression or upsetting of the formed article, although the dough used for pretzels offers a considerable resistance to deformation.

Having thus explained the operation of the machine parts contributing directly to the shaping operation, the construction and operation of the mechanism will now be described.

The slide 8 carrying the cutter 3 is supported, on a guideway of the machine frame 1, which guideway may be formed, for instance, by a pair of guide rods 8'. The cutter body itself, which in this case comprises five cutters arranged side by side, is secured to a transverse bar 7 extending over the whole width of the machine and is fixedly connected to the slide 8. Said transverse bar 7 moreover carries the above mentioned guiding plate 31, Figs. 10 and 11, through the holes of which pass the ejector pins 26, Fig. 2, which are supported on to the machine frame 1 by means of a bearing plate 32. The slide 8 is operated by a double crank gear consisting of two crank discs 10 secured on the outer end of a shaft of the machine frame and two connecting rods 9, Fig. 2, the common shaft of the two crank discs 10 being driven by the abovementioned main shaft 12 through either a belt, or rope, or chain 11. It should be noted that the guiding plate 31 for the ejecting pins 26 may be moved on the machine frame in the longitudinal direction of the slide motion to permit the ends of the pins 26 to pass more or less through the holes 27 of the cutters 3.

The movement of the pressing fingers 20 and ejecting pins 21 for the scrap 22 of the hole in the base body 2 is achieved as follows:

As will be seen from Figs. 7 and 8, the pressing fingers 20 are rigidly mounted on a transverse bar 36 which is longitudinally slidable, by means of two sliding rods 34, in the machine frame, i. e., in the transverse bars 6 and 35 thereof. The transverse bar 6 simultaneously serves as a carrier for the abutment or base body 2 which of course just as the cutter 3 may be provided in a multiple arrangement. The control movement of the slide formed by the rods 34 sliding in the machine frame is effected by a control shaft 37 of the machine frame 1 through two pairs of cam discs 40 and 49 acting alternatingly upon two pairs of rollers 42 and 50 of a control gear for the pair of connecting rods 34. This control gear consists of a pair of draw rods 53 forming a bridge over the control shaft 37 as shown in Fig. 2, in whose ends are journalled the pairs of rollers 42 or 50. The journals of the rollers 42 are supported in the bifurcated ends of the pair of connecting rods 34 and the journals of the rollers 50 are supported in the bifurcated ends of special slide pins 51 mounted in a cross bar 52 of the machine frame and secured against rotation. Thus by rotation of the control shaft 37 the cam discs 40 act upon the pair of rollers 42 with the tendency of forcing the pressing fingers 20 out of the base body 2, Fig. 10, while the pair of cam discs 49 act to retract the pressing fingers 20 in the direction of the arrow shown in the left hand side of Fig. 12. The two pairs of cam discs 40 and 49 are angularly displaced on the shaft 37 so as to be able to operate in proper time alternation.

The movement of the ejecting pin 21 for the scrap 22 which is to be carried out in the same direction, but at a higher speed, is caused by the movement of the slide formed by the transverse bar 36 and the connecting rods 34 as follows: Fastened to a pair of hubs fixedly connected to the connecting rods 34 are two bearing pins 44 for two-armed oscillating levers 43, Figs. 7 and 8. The outer and shorter arms of these levers 43 are secured to two pins 45 fastened to the machine frame 1, while the inner arms of the levers 43 are secured by two driving pins 46 with a transverse bar 47 sliding on the connecting rods 34 by means of two guiding bosses 48. Rigidly fastened to this transverse bar 47, but so as to be longitudinally adjustable, are the ejecting pins 21 for the scrap 22. The movement of the slide thus is transmitted to the ejecting pins 21, through the two-armed levers 43, in such a manner that the ejecting pins are moved at a higher speed than the pressing fingers 20, so that they lead the pressing fingers, see Figs. 9 and 10.

The steep chute 28 for the ejected formed articles or pretzels 5 is followed by a conveying apron 33 by which the rows of pretzels are continuously delivered to a horizontal receiving apron 60 or to conveying proofing pans continuously passing on this apron. Of course, this apron 60 also could convey the pieces of dough without proofing pans to the conveying means of an automatic proofing apparatus from which they could be delivered, after being sprayed with saline solution and sprinkled with salt, onto the baking oven apron directly following said means. The conveying apron 33 is also driven by means of either a belt, or rope or chain 61, driving the sprocket disc 62 of the bearing roller of the conveying apron, from the main shaft 12 which in turn is imparted its rotary motion from the motor 15, through an intermediate shaft 14, a belt drive and a belt pulley 13. The rotation of the controlling or operating shaft 37 is also derived from the main shaft 12 through the driving means 39. A similar drive 63, 64, 65, 66 is provided for driving the receiving apron 60 from the main shaft 12, Fig. 2.

The residual dough leaving the deviating sheet 29 is either collected in the assembling box 30 shown in Fig. 2, which in this case has to be emptied at certain intervals, or it is recirculated to the web rolling machine by an automatic conveying device which is known per se for such plants so that it will not be necessary to illustrate this known conveying device in connection with the invention.

My machine is adapted both for making flat cookies as well as biscuits and a wide variety of formed articles of dough, but it can also be used for making shaped articles of plastic material, such as, artificial resin. The cutter and abutment means together with their appertaining part are interchangeable for producing different shapes with the same machine.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A machine for cutting out shaped articles from an intermittently travelling web of plastic material, comprising a machine frame, cutting means including a cutter shell adapted to be alternatingly advanced to, and retracted from the web at right angles thereto, and an inner bottom receding from the cutting edges of said cutter shell, abutment means against which the cutting means is adapted to operate, stripping means surrounding the cutter shell in its cutting position and arranged adjacent to the surface of the web, means for clamping the shaped articles against said bottom, said clamping means being slidable in the machine frame, from a position behind or below the plane of travel of said web, means for reciprocating said clamping means in synchronism with the cutting means in such a manner that it partakes in a part of the retractive stroke of the cutter shell out of the web of plastic material, whereby the shaped article is clamped against said bottom, thus leaving a scrap web of plastic material whereupon the clamping means returns to its initial position behind or below the plane of travel of the web, the latter being arranged either vertically or horizontally, thus permitting a further feeding stroke of the web, means for ejecting the shaped article from the cutter shell, said ejecting means acting near the outer end of the stroke of the cutter shell, and means for separately removing the shaped articles and the scrap web from the cutting zone.

2. A machine for cutting out shaped articles from an intermittently traveling web of plastic material, comprising a machine frame, cutting means including a cutter shell adapted to be alternatingly advanced into, and retracted from, the web, at right angles thereto, and an inner bottom receding from the cutting edges of said cutter shell, abutment means against which the cutting means is adapted to operate, stripping means surrounding the cutter shell in its cutting position and arranged adjacent to the surface of the web so as to be adapted to guide said web, means for clamping the shaped article against said bottom, said clamping means being slidable in the machine frame, means for reciprocating said clamping means in synchronism with the cutting means in such a way that it partakes in a part of the retractive stroke of the cutter shell out of the web of plastic material, whereby the shaped article is clamped against the said bottom, thus leaving a scrap of plastic material, whereupon the clamping means returns to its initial position behind or below the plane of travel of the web, the latter being arranged either vertically or horizontally, thus permitting a further feeding stroke of the web, means for ejecting the shaped article from the cutter shell, said ejecting means acting near the outer end of the stroke of the cutter shell, and means for separately removing the shaped articles and the scrap web from the cutting zone.

3. A machine for cutting out shaped articles from an intermittently traveling web of plastic material such as dough, comprising cutting means including a cutter shell adapted to be alternatingly advanced into, and retracted from, the web, at right angles thereto, and an inner bottom receding from the cutting edges of said cutter shell, stripping means surrounding the cutter shell in its cutting position and arranged adjacent to the surface of the web, abutment means against which the cutting means is adapted to operate, whereby the shaped article is clamped between the abutment means and said bottom, thus leaving a scrap web of dough, whereupon the abutment means returns to its initial position behind or below the plane of travel of the web, thus permitting a further conveying stroke of the web, means for ejecting the shaped article from the cutter shell, said ejecting means acting near the outer end of the stroke of the cutter shell, and means for separately removing the shaped articles and the scrap web from the cutting zone.

4. A machine for cutting out shaped articles from an intermittently traveling web of dough, comprising cutting means including a cutter shell adapted to be alternatingly advanced into, and retracted from, the web, at right angles thereto, and an inner bottom receding from the cutting edges, stripping means surrounding the cutter shell in its cutting position and arranged adjacent to the surface of the web, stationary abutment means against which the cutting means is adapted to operate, pressing finger means slidable in the stationary abutment means parallelly to the movement of the cutter shell, means for reciprocating said pressing finger means in synchronism with the cutter shell in such a manner that the pressing finger means partakes in a part of the retractive stroke of the cutter shell out of the web of dough, whereby the cut article is clamped between the pressing fingers means and said bottom, thus leaving a scrap web of dough, whereupon the pressing finger means returns to its initial position behind the plane of travel of the web, so as to permit a further conveying stroke of the web, means for ejecting the shaped article from the cutter shell, said ejecting means acting near the outer end of the stroke of the cutter shell, and means for separately removing the shaped articles and the scrap web of dough from the cutting zone.

5. A machine for cutting out shaped articles from an intermittently traveling web of dough, comprising cutting means including a cutter shell adapted to be alternatingly advanced into, and retracted from, the web, at right angles thereto, and a perforated inner bottom receding from the cutting edges, abutment means against which the cutting means is adapted to operate, stripping means surrounding the cutter shell in its cutting position and arranged adjacent to the surface of the web, means for clamping the shaped article against said bottom, said clamping means being slidable in the machine frame, means for reciprocating said clamping means in synchronism with the cutting means in such a manner that it partakes in a part of the retractive stroke of the cutter shell out of the web of plastic material, whereby the shaped article is clamped against said bottom, thus leaving a scrap web of dough, whereupon said clamping means returns to its initial position behind the plane of travel of the web, thus permitting a further feeding stroke of the web, ejecting pin means slidably arranged in the said bottom of the cutting means and relatively issuing from the said bottom in the cutting direction, a stationary stop member located in the path of motion of the ejecting pin means and before the outer end of the stroke of the cutting means.

6. A machine for cutting out shaped articles from an intermittently traveling web of dough, comprising cutting means including a cutter shell adapted to be alternatingly advanced into, and retracted from, the web, at right angles thereto, and a perforated inner bottom receding from the cutting edges, abutment means against which the cutting means is adapted to operate, stripping means surrounding the cutter shell in its cutting position and arranged adjacent of the surface of the web, means for clamping the shaped article against said bottom, said clamping means being slidable in the machine frame, means for reciprocating said clamping means in synchronism with the cutting means in such a manner that it partakes in a part of the retractive stroke of the cutter shell out of the web of plastic material, whereby the shaped article is clamped against said bottom, thus leaving a scrap web of dough, whereupon said clamping means returns to its initial position behind the plane of travel of the web, thus permitting a further stroke of the web, ejecting pin means fixedly arranged in the path of motion of the cutting means in such a manner that the ejecting pins traverse the perforations of the said bottom of the cutting means before the cutting means has reached the outer end of its stroke, and means for separately removing the shaped articles and the scrap web from the cutting zone.

7. A machine for cutting out shaped articles from an intermittently traveling web of dough, comprising a machine frame, cutting means including a cutter shell adapted to be alternatingly advanced into, and retracted from, the web, at right angles thereto, and a perforated inner bottom receding from the cutting edges and forming an engraved pattern, abutment means against which the cutting means is adapted to operate, stripping means surrounding the cutter shell in its cutting position and arranged adjacent to the surface of the web, means for clamping the shaped article against said bottom, said clamping means being slidable in the machine frame, means for reciprocating said clamping means in synchronism with the cutting means in such a manner that it partakes in a part of the retractive stroke of the cutter shell out of the web of dough, whereby the shaped article is clamped against the said bottom, thus leaving a scrap web of dough, whereupon the clamping means returns to its initial position behind the plane of travel of the web, thus permitting a further feeding stroke of the web, means for ejecting the shaped article from the cutter shell, said ejecting means acting near the outer end of the stroke of the cutter shell, and means for separately removing the shaped articles and the scrap web from the cutting zone.

8. A machine for cutting out shaped articles from an intermittently traveling web of dough, comprising a machine frame, cutting means including a cutter shell adapted to be alternatingly advanced into, and retracted from, the web, at right angles thereto, and a perforated inner bottom receding from the cutting edges, abutment means against which the cutting means is adapted to operate, stripping means surrounding the cutter shell in its cutting position and arranged adjacent to the surface of the web, means for clamping the shaped article against said bottom, said clamping means being slidable in the machine frame, means for reciprocating said clamping means in synchronism with the cutting means in such a manner that it partakes in a part of the retractive stroke of the cutter shell out of the web of dough, whereby the shaped article is clamped against said bottom, thus leaving a scrap web of dough, whereupon the clamping means returns to its initial position behind the plane of travel of the web, thus permitting a further feeding stroke of the web, means for ejecting the shaped article from the cutter shell, said ejecting means acting near the outer end of the stroke of the cutter shell, and means for separately removing the shaped articles and the scrap web from the cutting zone.

9. A machine for cutting out shaped articles from an intermittently traveling web of dough, comprising cutting means each including one outer shell and one or several inner shells the latter for cutting out hole scrap sections (trimmings) from the main body of the shaped article, the complete cutter shell unit adapted to be alternatingly advanced into, and retracted from, the web, at right angles thereto, stripping means surrounding the cutter shell in its cutting position and arranged adjacent to the surface of the web, stationary abutment means against which the cutting means is adapted to operate, pressing finger means slidable in the stationary abutment means parallel to the movement of the cutter shell, means for reciprocating said pressing finger means in synchronism with the cutter shells in such a manner that the pressing finger means partakes in a part of the retractive stroke of the cutter shells out of the web of dough, whereby the shaped article and the hole scrap sections within is clamped between the pressing finger means and said bottom, thus leaving a scrap web, ejecting means slidable in the stationary abutment means parallel to the pressing finger means for ejecting the said hole scrap sections resulting in the manufacture of articles with enlarged holes within, means for operating said ejecting means in such a manner that the ejecting means leads the pressing fingers and traverses ports provided in the said bottom of the cutting means, as the latter is retracting, thereby rearwardly ejecting the hole scrap sections from the shaped article clamped between the pressing finger means and the said bottom of the cutting means, whereupon the pressing finger means and said ejecting means return to their initial position behind the plane of travel of the web of dough, thus permitting a further feeding stroke of the web, means for ejecting the shaped article from the combined cutter shells, said ejecting means acting near the outer end of the stroke of the cutter shells after the beginning of the combined returning movements of the pressing finger means and of the other ejecting means for hole scrap, and means for separately removing the shaped articles, the hole scrap sections and the remaining scrap web from the cutting zone.

10. A machine for cutting out shaped articles from an intermittently traveling web of dough, comprising cutting means including a cutter shell adapted to be alternatingly advanced into, and retracted from, the web, at right angles thereto, and an inner bottom receding from the cutting edges and forming an engraved pattern, abutment means against which the cutting means is adapted to operate, said abutment means forming an engraved pattern facing the web of dough and registering with the engraved bottom pattern enclosed by the cutter shell so as to form a closed mould with a combined uniform cross section, stripping means surrounding the cutter shell in its cutting position and arranged adjacent to the surface of the web, means for clamping the shaped article against said bottom, said clamping means being slidable in the machine frame, means for reciprocating said clamping means in synchronism with the cutting means in such a manner that it partakes in a part of the retractive stroke of the cutter shell out of the web of dough, whereby the shaped article is clamped against the said bottom, thus leaving a scrap web, whereupon the clamping means returns to its initial position behind the plane of travel of the web, thus permitting a further feeding stroke of the web, means for ejecting the shaped article from the cutter shell, said ejecting means acting near the outer end of the stroke of the cutter shell, and means for separately removing the shaped articles and the scrap web from the cutting zone.

11. A machine for cutting out shaped articles from intermittently traveling web of dough, comprising cutting means each including one outer shell and one or several inner shells, the latter for cutting out hole scrap sections from the main body of the shaped article, the complete cutter shell unit adapted to be alternatingly advanced into, and retracted from, the web, at right angles thereto, and a perforated inner bottom between the different cutter shells, said bottom receding from the cutting edges so as to form with the latter an engraved pattern, leaving enlarged ports enclosed by the inner cutter shells, stripping means surrounding the outer cutter shell in its cutting position and arranged adjacent to the surface of the web, stationary abutment means against which the cutting means is adapted to operate, said abutment means forming an engraved bottom pattern facing the web of dough and registering with the engraved bottom pattern of the cutter shells so as to form a closed mould, pressing finger means slidable in the stationary abutment means parallel to the movement of the cutter shell unit, means for reciprocating said pressing finger means in synchronism with the cutter shell in such a manner that the pressing finger means partakes in a part of the retractive stroke of the cutter shell out of the web of dough, whereby the shaped article with its hole scrap sections enclosed therein is clamped between the pressing finger means and said bottom thus leaving a scrap web of dough, ejecting means slidable in the stationary abutment means parallel to the pressing finger means, for ejecting the hole scrap sections resulting in the manufacture of shaped articles with enlarged holes within, and means for operating said ejecting means in such a way that the ejecting means leads the pressing fingers and traverses said ports surrounded by the inner cutter shells of the cutting means, as the latter is retracting, thereby rearwardly ejecting the hole scrap sections from the shaped article clamped between the pressing finger means and the said bottom of the cutting means, whereupon the pressing finger means and said ejecting means return to their initial position behind the plane of travel of the web of dough, thus permitting a further feeding stroke of the web, means for ejecting the shaped article from the combined cutter shells, said ejecting means acting near the outer end of the stroke of the cutter shells after the beginning of the combined returning movements of the pressing finger means and of the other ejecting means for the hole scrap sections and the remaining scrap web from the cutting zone.

12. A machine for cutting out shaped articles from an intermittently traveling web of dough, comprising cutting means each including one outer cutter shell and one or several inner cutter shells, the latter for cutting out hole scrap sections from the main body of the article to be shaped, the complete cutter shell unit adapted to be alternatingly advanced into, and retracted from, the web, at right angles thereto, and a perforated inner bottom extending between the different cutter shells, said bottom receding from the cutting edges so as to form with the latter an engraved pattern, leaving enlarged ports enclosed by the inner cutter shells, stripping means surrounding the outer cutter shell in its cutting position and arranged adjacent to the surface of the web, stationary abutment means against which the cutting means is adapted to operate, said abutment means forming an engraved pattern facing the web and registering with the engraved bottom pattern of the cutter shells so as to form a closed mould like a pretzel or a ring, the cross section across each region of the closed mould being at least nearly a circle, pressing finger means slidable in the stationary abutment means parallel to the movement of the cutter shell unit, means for reciprocating said pressing finger means in synchronism with the cutter shell in such a way that the pressing finger means partakes in a part of the retractive stroke of the cutter shells out of the web of dough, whereby the shaped article with its hole scrap sections enclosed therein is clamped between the pressing finger means and said bottom, thus leaving a scrap web of dough, ejecting means slidable in the stationary abutment means parallel to the pressing finger means, for ejecting the said hole scrap sections resulting in the manufacture of shaped articles with enlarged holes within, means for operating said ejecting means in such a way that the ejecting means leads the pressing fingers and traverses said ports surrounded by the inner cutter shells of the cutting means, as the latter is retracting, thereby rearwardly ejecting the hole scrap sections from the shaped article clamped between the pressing finger means and the said bottom of the cutting means, whereupon the pressing finger means and said ejecting means return to their initial position behind the plane of travel of the web of dough, thus permitting a further feeding stroke of the web, means for ejecting the shaped article from the combined cutter shells, said ejecting means acting near the outer end of the stroke of the cutter shells after the beginning of the combined returning movements of the pressing finger means and of the other ejecting means for hole scrap, means for intermittently feeding the web of dough through the cutting zone in an at least nearly vertical direction, and much inclined deviating chutes below the path of movement of the cutting means for separately removing the forwardly ejected shaped articles, the remaining scrap web and the rearwardly ejected hole scrap sections from the cutting zone.

References Cited in the file of this patent

UNITED STATES PATENTS

| | | |
|---|---|---|
| 761,842 | Laukhuff | June 7, 1904 |
| 998,017 | Laukhuff | July 18, 1911 |
| 1,017,374 | Betz | Feb. 13, 1912 |
| 1,419,276 | Lentz | June 13, 1922 |
| 2,612,853 | Bale | Oct. 7, 1952 |